US010026128B2

(12) United States Patent
Babel et al.

(10) Patent No.: US 10,026,128 B2
(45) Date of Patent: Jul. 17, 2018

(54) APPARATUSES, METHODS AND SYSTEMS FOR A VOLATILITY EXPIRATION INDEX PLATFORM

(75) Inventors: Michael G. Babel, Oceanside, NY (US); Thomas E. Heebner, Summit, NJ (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 13/207,049

(22) Filed: Aug. 10, 2011

(65) Prior Publication Data

US 2012/0041891 A1    Feb. 16, 2012

Related U.S. Application Data

(60) Provisional application No. 61/372,412, filed on Aug. 10, 2010, provisional application No. 61/372,420, filed on Aug. 10, 2010.

(51) Int. Cl.
*G06Q 40/00* (2012.01)
*G06Q 40/06* (2012.01)

(52) U.S. Cl.
CPC .................. *G06Q 40/06* (2013.01)

(58) Field of Classification Search
CPC ...................................................... G06Q 40/06
USPC ................................................. 705/36 R, 36
See application file for complete search history.

(56) References Cited

U.S. PATENT DOCUMENTS

| | | | | |
|---|---|---|---|---|
| 7,620,578 B1* | 11/2009 | Belton | ................... | G06Q 40/06 705/35 |
| 2003/0225657 A1* | 12/2003 | Whaley | ................. | G06Q 40/06 705/36 R |
| 2005/0027634 A1* | 2/2005 | Gershon | ................ | G06Q 40/04 705/37 |

(Continued)

OTHER PUBLICATIONS

Economic Catastrophe Bonds, Author: Coval, Joshua D; Jurek, Jakub W; Stafford, Erik, Publication info: The American Economic Review 99.3: 628-666. American Economic Association. (Jun. 2007).*

(Continued)

*Primary Examiner* — Muriel Tinkler
*Assistant Examiner* — John Anderson
(74) *Attorney, Agent, or Firm* — DLA Piper LLP (US)

(57) ABSTRACT

The APPARATUSES, METHODS AND SYSTEMS FOR A VOLATILITY EXPIRATION INDEX PLATFORM ("VEIP") transforms user and market data inputs via VEIP components into Vol Ex Index publication and Vol Ex Index instrument communications outputs. A current reference security price may be determined for a reference security. A plurality of option strike prices may be derived from the current reference security price. Implied volatility and delta may be determined for options associated with each derived option strike price and used to calculate a delta-weighted implied volatility for each derived option strike price. A weighting for each derived option strike price may be determined and used along with the delta-weighted implied volatilities to calculate a volatility expiration index value for the reference security. Using the volatility expiration index value, a volatility expiration index financial instrument may be generated and introduced into a financial instrument exchange market.

15 Claims, 7 Drawing Sheets

(56) References Cited

U.S. PATENT DOCUMENTS

| | | | |
|---|---|---|---|
| 2005/0102214 A1* | 5/2005 | Speth et al. | 705/36 |
| 2005/0165669 A1 | 7/2005 | Montanaro et al. | |
| 2005/0227634 A1* | 10/2005 | Kori | H01Q 1/084 |
| | | | 455/90.3 |
| 2006/0100949 A1* | 5/2006 | Whaley | G06Q 40/02 |
| | | | 705/36 R |

OTHER PUBLICATIONS

Exploring deviations between prices and values in capital asset markets, Author: Jurek, Jakub Wojciech, Publication info: Harvard University (2008).*

International Search Report and Written Opinion, dated Nov. 25, 2011, for PCT International Application No. PCT/US11/47272, filed Aug. 10, 2011 (7 pages).

* cited by examiner

US 10,026,128 B2

APPARATUSES, METHODS AND SYSTEMS FOR A VOLATILITY EXPIRATION INDEX PLATFORM

RELATED APPLICATIONS

Applicant hereby claims priority under 35 USC §119 for U.S. provisional patent application Ser. No. 61/372,412 filed Aug. 10, 2010, entitled "Apparatuses, Methods and Systems for a Volatility Expiration Index Platform," and U.S. provisional patent application Ser. No. 61/372,420 filed Aug. 10, 2010, entitled "Apparatuses, Methods and Systems for a Volatility Expiration Index Platform,".

The entire contents of the aforementioned applications are herein expressly incorporated by reference.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to apparatuses, methods, and systems of investment and finance, and more particularly, to APPARATUSES, METHODS AND SYSTEMS FOR A VOLATILITY EXPIRATION INDEX PLATFORM.

BACKGROUND

Volatility is a measure of financial uncertainty or risk. For an investment product, such as a stock, volatility may refer to the uncertainty about the magnitude of changes in the stock's value over a given time. For example, for two stocks that currently have the same price, the future value of the stock with a relative higher volatility can be expected to be a wider range of values when compared to the stock with the lower volatility (i.e., the higher volatility stock is more likely to change price significantly, either up or down). Traditionally, investors have utilized products based on the Chicago Board Options Exchange's VIX®, a measure of market expectations for volatility over the next 30 days based on option prices on the S&P 500 Index.

BRIEF DESCRIPTION OF THE DRAWINGS

The accompanying appendices and/or drawings illustrate various non-limiting, example, innovative aspects in accordance with the present descriptions.

Figure 1:
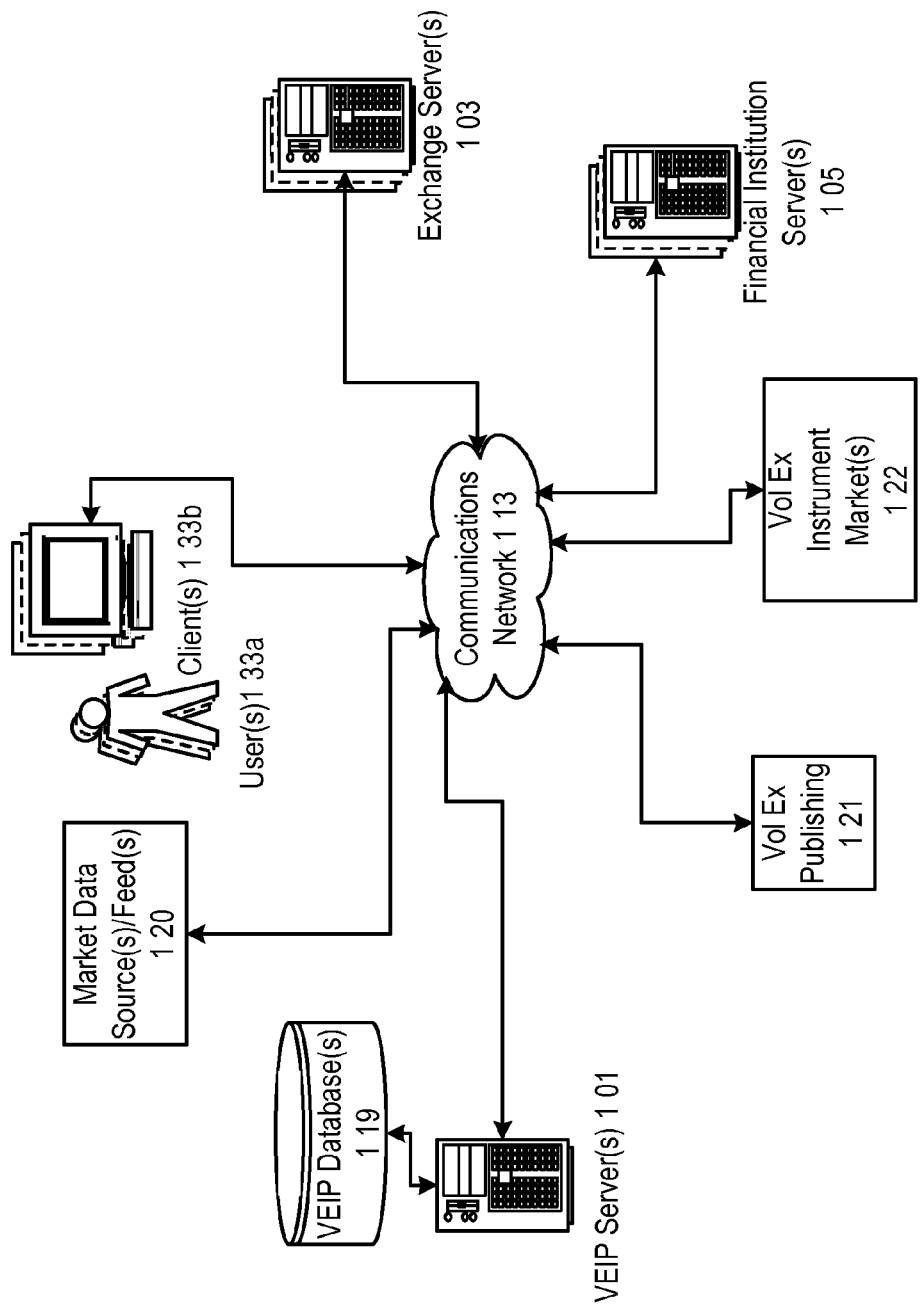
FIG. 1 is a schematic diagram illustrating data flows between VEIP components and associated entities for an embodiment of the VEIP.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Overview

This disclosure describes APPARATUSES, METHODS AND SYSTEMS FOR A VOLATILITY EXPIRATION INDEX PLATFORM ("VEIP") that facilitates, enhances, generates, enables and/or provides ("provides") calculation, determination, generation, management, analysis and/or communications relating to volatility expiration indexes/indices, associated underlying instruments (and/or the like), and/or financial instruments/products based on and/or influenced by the one or more volatility expiration indexes (and/or the like), facilitating access to and utilization of the term structure of volatility.

In one embodiment, the VEIP extends the time over which volatility is usefully measured and utilized, and may provide for increased accuracy of such measurements. In one such implementation, the VEIP determines and calculates volatility expiration indexes for specified sub-periods (e.g., for each expiration month over a given multi-month term) for a specified reference security. In one embodiment, the VEIP may be configured to measure/determine and provide volatility information such that volatility may be addressed by trading options of corresponding maturity. In some embodiments, the VEIP may generate and/or facilitate the construction of financial instruments (e.g., options and/or the like) based on such determined/generated expiration volatility indexes. Products based on Vol Ex Indexes may be priced real-time, and may provide numerous benefits and advantages over traditional volatility products that are forward priced. In some embodiments, Vol Ex Index products may provide real-time correlation to implied volatility and/or advantageous exercise options (e.g., may be American or European exercise and/or the like), which may result in increased correlation. Such Vol Ex Index products may allow investors to benefit from short term volatility movement, which they may otherwise not be able to accomplish/achieve.

In one embodiment, the VEIP determines the implied volatility for a series of at the money options, weighted by a determined delta, for each expiration month (and/or other specified period) available for options on various benchmark securities. This measure of volatility determined by the VEIP for each expiration month is the Volatility Expiration Index ("Vol Ex Index"). In some embodiments, the VEIP provides for the generation/creation, issuing, management, settlement, oversight, tracking, and/or the like for financial instruments, products, securities and/or the like that are based on and/or influenced by one or more Vol Ex Indexes. For example, in one implementation, the VEIP may provide cash settled, American or European Style, PM Settlement options on one or more Vol Ex Indexes. In some such embodiments, by way of such products, the VEIP may be configured to facilitate/allow investors to effectively and efficiently match the duration of their options exposure to one or more Vol Ex Indexes of the same maturity.

VEIP

FIG. 1 is a schematic diagram illustrating data flows between VEIP components and associated entities for an embodiment of the VEIP. In one implementation, the VEIP comprises one or more VEIP servers 101 implementing VEIP functionality and communicatively coupled to one or more VEIP databases 119, configured to store VEIP and associated data. The VEIP server 101 may also be coupled by a communication network 113 to one or more market data sources and/or market data feeds 120 (e.g., Bloomberg, Bloomberg's PhatPipe, Dun & Bradstreet, Reuter's Tib, Triarch, Options Price Reporting Authority (OPRA), etc.) to request and/or receive financial data used in the calculation, determination, generation, management, maintenance, and/or the like of VEIP indexes. A wide variety of different data may be received and/or requested, including but not limited to stock, derivative, security and/or other market data, specific pricing, risk, and/or the like data for individual securities and/or financials product, sets or portfolios of securities and/or financial products, and/or the like. The VEIP and/or associated systems/sub-systems and/or components/sub-components may process such market information to determine/calculate/generate Vol Ex Indexes. Such market information may also be utilized by the VEIP to generate, manage, oversee, promote, distribute, sell, buy, write, market, settle, trade, and/or maintain financial products/instruments (e.g., options), based on one or more Vol Ex Indexes ("Vol Ex instruments" or "instruments"). As such, depending on the implementation, VEIP server(s) may communicate with clients/users 133a/133b, Vol Ex Index publishing systems, entities, organizations, and/or components 121, exchange servers 103 (e.g., for exchange entities, securities marketplaces, etc.), financial institution servers 105 (e.g., for banks, brokerage houses, etc.), and/or a variety of Vol Ex instrument markets 122.

Figure 2:
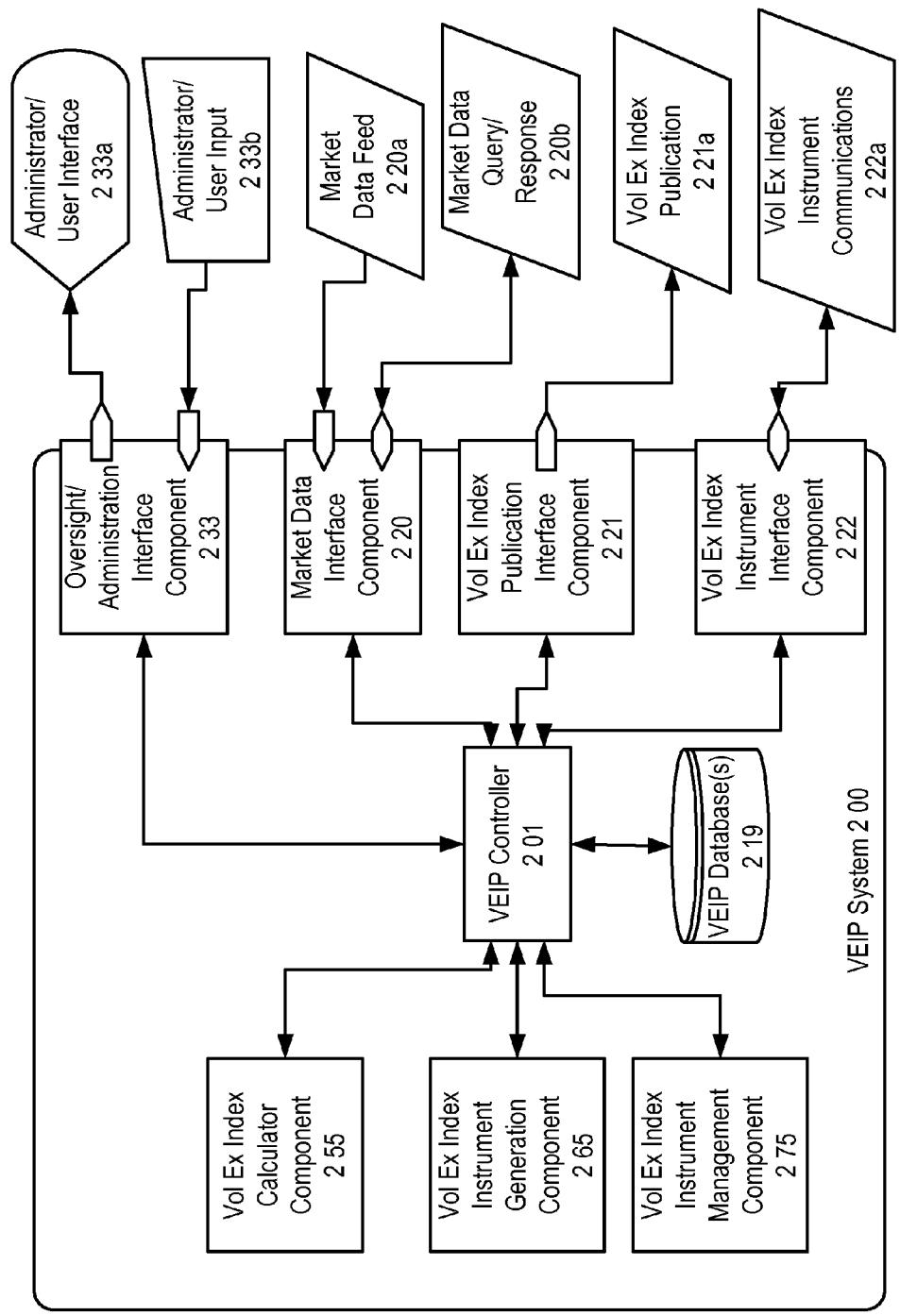
FIG. 2 illustrates aspects of VEIP system architecture in block-diagram form and data flow between and among various VEIP system components for operation of one embodiment of the VEIP.

FIG. 2 illustrates aspects of VEIP system architecture in block-diagram form and data flow between and among various VEIP system components for operation of one embodiment of the VEIP. A VEIP system 200 may include a number of functional/operational modules and/or data stores configured to carry out various VEIP features and/or functionality. A VEIP controller 201 may serve a central role in some embodiments of VEIP operation, orchestrating the reception, determination, generation, transmission and/or distribution of data and/or instructions to, from and between VEIP modules and/or allowing further utilization and/or analysis of data generated and/or collected during VEIP operation, and/or storage of data in one or more databases 219. The VEIP controller 201 may be coupled to one or more operational modules configured to implement various features associated with aspects of VEIP operation.

In one implementation, the VEIP controller 201 may be coupled to a market data interface component (MDIC) 220 configured to query and/or receive market data from one or more market data sources 220a and/or feeds 220b, and/or the like. For example, the market data may be a quote in XML format substantially in the following form:

```
<XML>
    <Quote>
        <InstrumentType>Option</InstrumentType>
        <InstrumentSubType>Call</InstrumentSubType>
        <Symbol>XYZ</Symbol>
        <BidPrice>$4.00</BidPrice>
        <AskPrice>$4.05</AskPrice>
        <LastTradePrice>$4.03</LastTradePrice>
        <LastTradeSize>100</LastTradeSize>
        <LastTradeTime>20110801-12:12:12</LastTradeTime>
    </Quote>
</XML>
```

In one implementation, the VEIP controller 201 may be coupled to an index calculator component (CC) 255 that processes received and/or stored data (e.g., received via the market data interface component 220 and/or stored in the database(s) 219) to determine/calculate one or more Vol Ex Indexes. For example, the Vol Ex Index values may be stored via a SQL statement substantially in the following form:

```
INSERT INTO VEIP_IndexValuesTable (IndexID, IndexValue,
IndexValueTime
VALUES ('index ID', 'index value', 'time when index value was
in effect')
```

In one implementation, the VEIP controller 201 may be coupled to a publication interface component (PIC) 221 configured to publish, transmit, communicate, distribute, etc., Vol Ex Index information 221a (e.g., Vol Ex Index values determined by the calculator component 255). For example, the Vol Ex Index values may be retrieved via a SQL statement substantially in the following form:

```
SELECT IndexValue, IndexValueTime
FROM VEIP_IndexValuesTable
WHERE IndexID='index ID'
```

The Vol Ex Index values may be published via XML messages substantially in the following form:

```
<XML>
    <IndexData>
        <IndexID>ID135I</IndexID>
        <Symbol>ABC</Symbol>
        <IndexValue>102</IndexValue>
        <IndexValueTime>20110801-10:10:10</IndexValueTime>
    </IndexData>
</XML>
```

In some implementations, the VEIP controller 201 may be coupled to an instrument interface component (IIC) 222 configured to distribute, receive, transmit, respond, generate, monitor, etc., information pertaining to Vol Ex instruments 222a, for example, to effectuate and/or monitor Vol Ex instrument transactions and/or the like (e.g., with an exchange server 103). For example, a Vol Ex instrument order may be placed via FIX API using FIX messages substantially in the following form:

```
8=FIX.5.0|9=155|35=D|49=Firm1|56=Firm2|34=100|11=Order1|55=
VolExInstrument1|
54=2|52=20110801-10:10:12|60=20110801-10:10:12|38=200|40=1|10=123
```

The above message indicates that it is in FIX 5.0 format, it is sent by Firm1 to sell 200 shares of VolExInstrument1 (e.g., an option on a Vol Ex Index) to Firm2. In the above message, a number on the left side of an equal sign represents a field and fields are separated by a "|" symbol. The numbers in the above message correspond to the following fields: BeginString(8), BodyLength(9), MsgType(35), SenderCompID(49), TargetCompID(56), MsgSeqNum(34), ClOrdID(11), Symbol(55), Side(54), SendingTime(52), TransactTime(60), OrderQty(38), OrdType(40), CheckSum(10).

In one implementation, the VEIP controller 201 may further be coupled to an oversight/administration interface component (AIC) 233 configured to communicate and/or provide a user interface 233*a* through which an administrator can monitor and/or interact 233*b* with VEIP system parameters and settings, data management, access controls, and/or the like.

In some implementations, the VEIP controller 201 may be coupled to an index instrument generation component (IGC) 265 and/or instrument management component (IMC) 275 that process determined Vol Ex Index information and/or other stored/received data (e.g., received via the instrument interface component 222 and/or stored in the database(s) 219) to generate Vol Ex instruments and/or associated information and/or facilitate the management of the same. Depending on the implementation, the VEIP and/or associated components may generate and/or manage a variety of financial products/instruments based on/related to Vol Ex Indexes.

Figure 3:
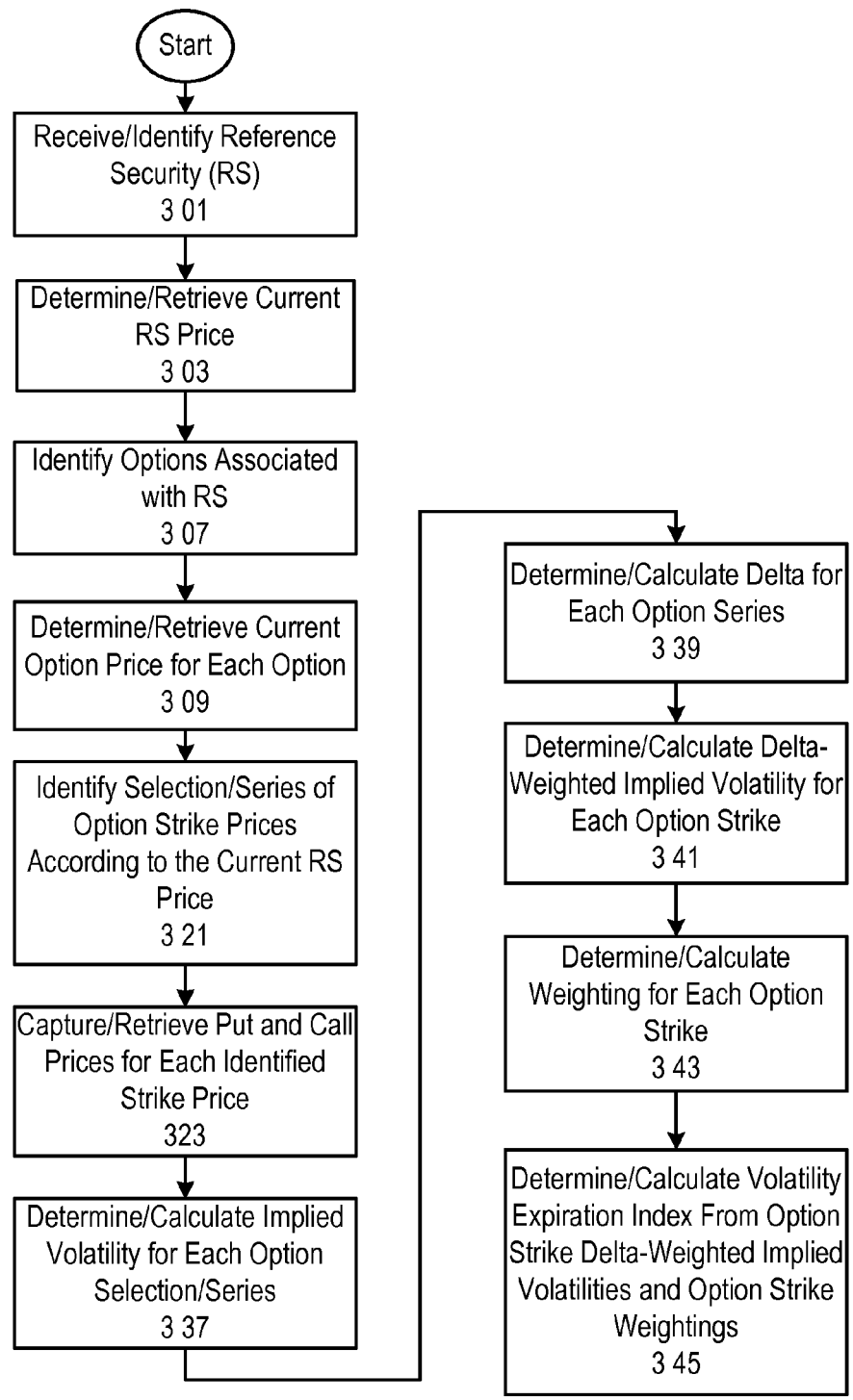
FIG. 3 provides a logic flow diagram illustrating the determination of a Vol Ex Index or indexes for one embodiment of the VEIP.

FIG. 3 provides a logic flow diagram illustrating the determination of a Vol Ex Index or indexes for one embodiment of the VEIP (e.g., as implemented by a VEIP component, such as the calculator component 255, discussed above). The VEIP may receive or identify a reference security ("RS") 301 (e.g., according to a rule or setting, and/or requested by a user, external entity, and/or administrator), and determine/retrieve the current price of the RS 303. Options associated with the RS may then be identified 307 and associated option prices determined/retrieved 309 (e.g., from market data and/or according to one or more pre-specified rules or settings), and periodic (e.g., monthly) data may be collected and processed. The VEIP may then identify a selection and/or series of option strike prices according to the current RS price 321, and retrieve put and call prices for each identified strike price 323. For each option series, the VEIP may then calculate the implied volatility 337 and determine the delta 339. The VEIP may then calculate the delta-weighted implied volatility for each option strike 341, and calculate the weighting for each option strike 343. Then, using the option strike delta-weighted implied volatilities and option strike weightings, the VEIP may determine the volatility expiration index for the RS.

Figure 4A:
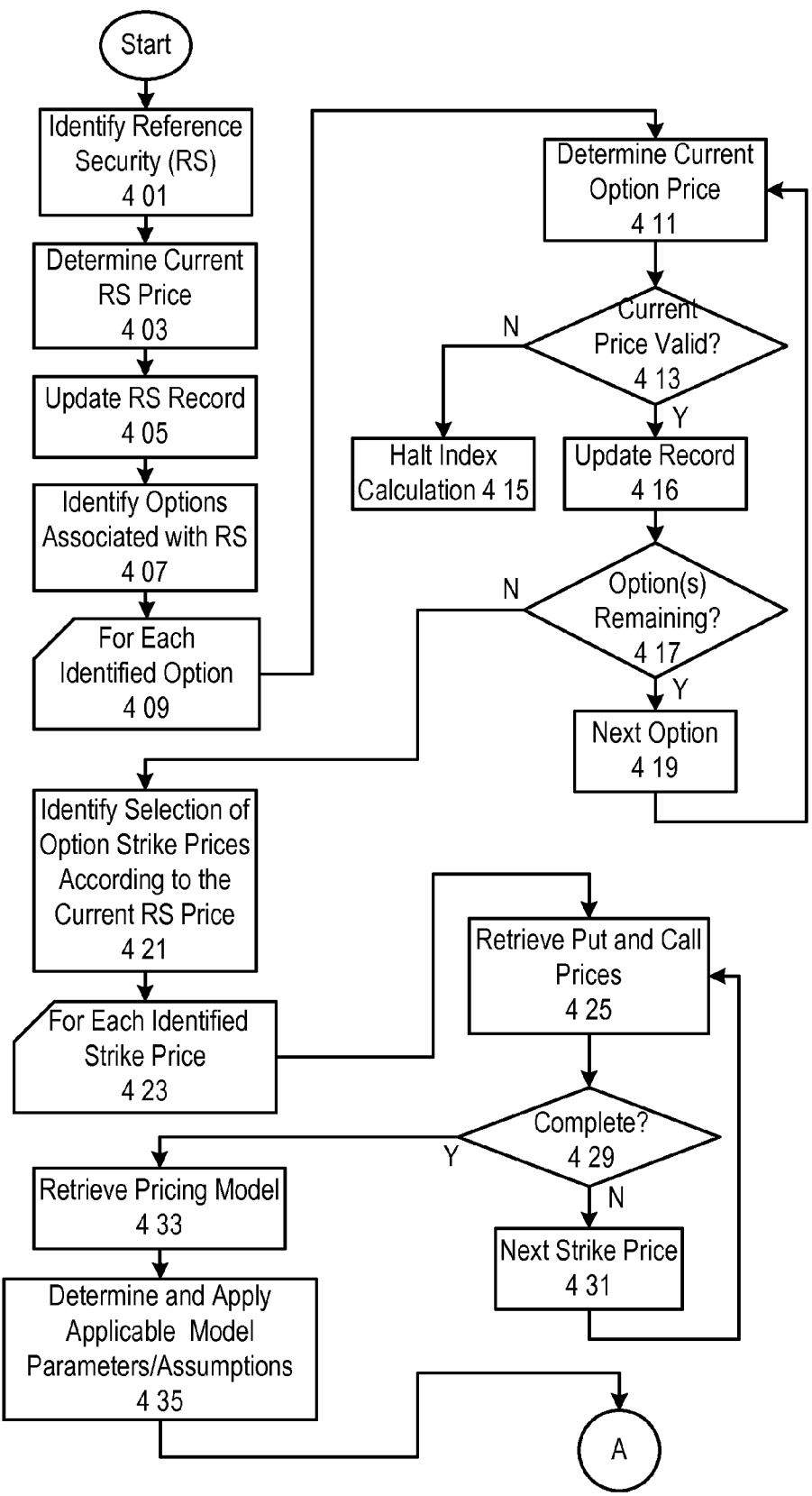
FIGS. 4A-4C provide logic flow diagrams illustrating aspect of Vol Ex Index determination for some embodiments of the VEIP.
Figure 4B:
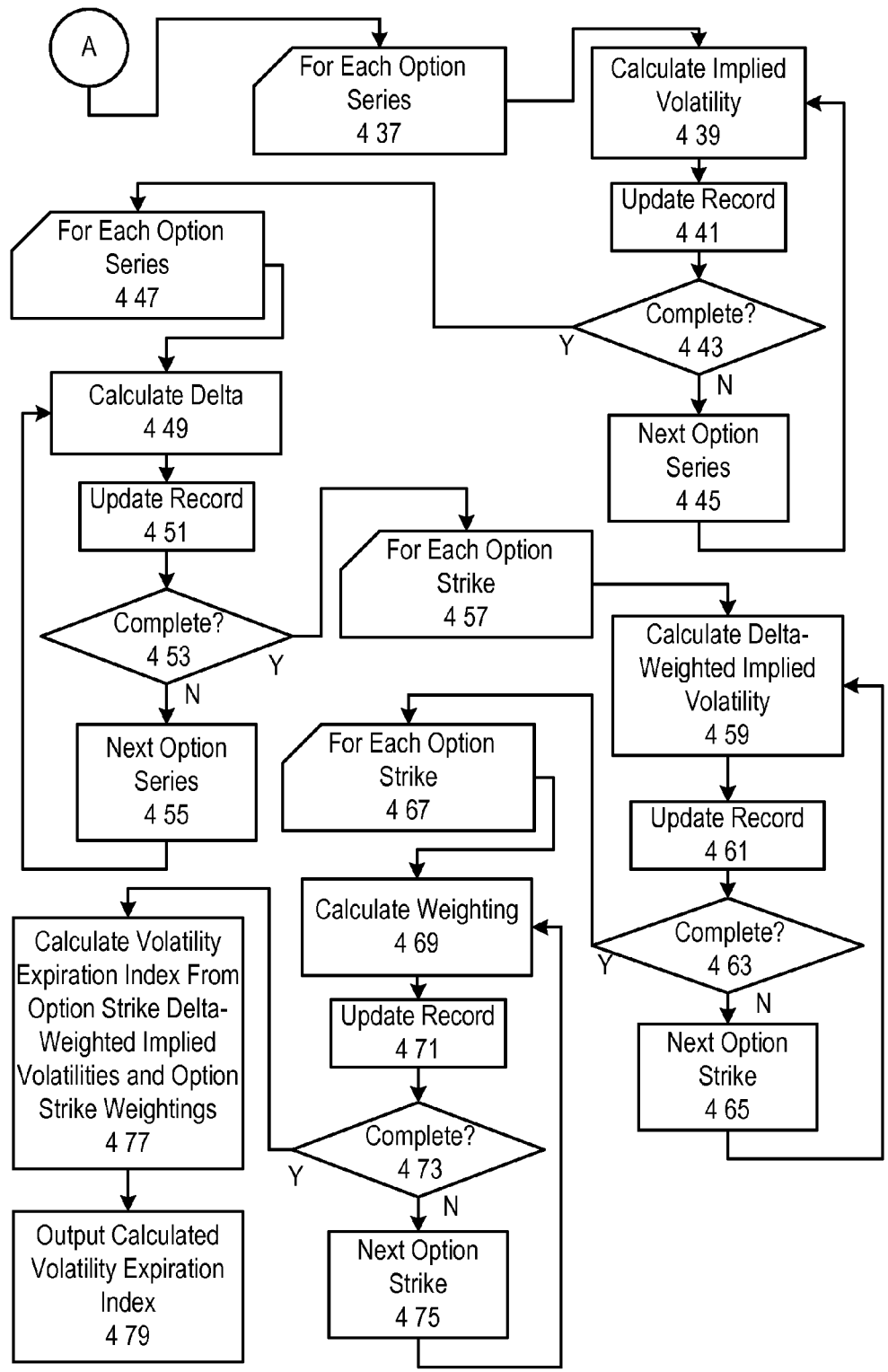
Figure 4C:
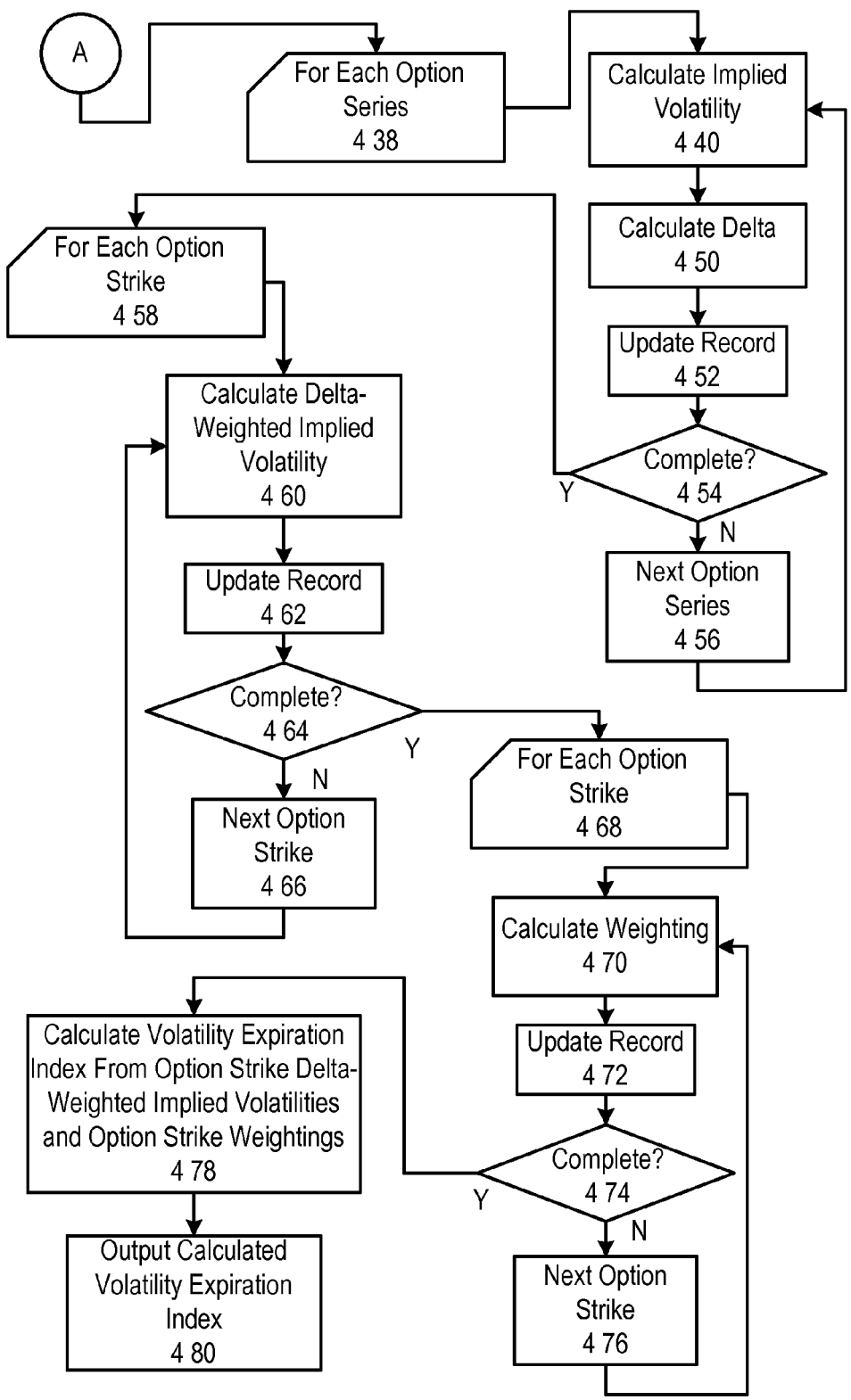

FIGS. 4A-4C provide additional detail for volatility expiration index determination for some embodiments and implementations of the VEIP. In FIG. 4A, a RS may be identified at 401. For example, a configuration file substantially in the following form that lists reference securities for which Vol Ex Indexes should be calculated may be iterated through:

| Reference Securities: |
| --- |
| SPY |
| IWM |
| GLD |
| XLE |
| XLK |

In one implementation, the VEIP may observe, in real time, the price of an underlying reference security and/or the prices of its associated options. The reference security or securities may be a variety of financial instruments or products, for example, Exchange Traded Funds ("ETF's") that track a wide variety of asset classes, and/or individual stocks. The current price of the RS may be determined at 403. For example, the price may be determined based on a quote from an exchange where the RS is trading. A database record (e.g., stored in the market data table in the VEIP database) may be updated at 405 with the price information.

Options associated with the RS may be identified at 407. For example, the VEIP may identify a series (e.g., six) of options with at the money option ("ATM") strike prices based on the current price of the RS. In various implementations, the number of options identified may be chosen to smooth the Vol Ex Index, to make it harder to manipulate the value of the Vol Ex Index, to base the Vol Ex Index on options with the most volume, and/or the like. In some implementations, identification of options may be dynamic, such that, in this example, as the RS moves in value, the 6 strike prices deemed to be at the money may change as well. For example, if the reference security last traded price is 119.01, the ATM strike prices used in the by calculation by the VEIP may be 117, 118, 119, 120, 121, and 122. If the reference security drops in value to 118.99, the ATM strike prices used may be 116, 117, 118, 119, 120, and 121. For ease of understanding this example, the strikes are referred to as M for the middle strike, L1 for the $1^{st}$ lower strike below M, L2 for the $2^{nd}$ lowest strike below M, U1 for the $1^{st}$ upper strike above M, U2 for the $2^{nd}$ upper strike above M and U3 for the $3^{rd}$ upper strike above M. In this example, M=119, L1=118, L2=117, U1=120, U2=121 and U3=122. The strike prices selected may be used for each of the expiration months (and/or other specified period(s)) in existence in order to calculate a Vol Ex Index for each available expiration month.

In some implementations, for each identified option 409, the current option price may be determined 411 (e.g., for a put and a call). A determination may be made at 413 whether the current option price is valid. In one embodiment, the current option price is valid if the following error-checking logic is satisfied:

There should be a last sale in the RS, and for the last sale of the RS a specified number (e.g., 68%) of quote values in a specified number (e.g., 10) of periods (e.g., one period may be equal to one second) should not exceed the RS collar logic.

For the RS, a value does not exceed the RS collar logic if the value differs by no more than a specified number (e.g., 1%).

There should be a quote for each identified option (e.g., a quote for each of the 6 calls and for each of the 6 puts).

For each identified option, a specified number (e.g., 68%) of quote midpoint values in a specified number (e.g., 10) of periods should not exceed the option collar logic.

For an option, a value does not exceed the option collar logic if the value differs by no more than the following: for options priced $0.00-$1.99—25 cents, for options priced $2.00-$5.00—40 cents, for options priced $5.01-$10.00—50 cents, for options priced $10.01-$20.00—80 cents, for options priced more than $20.00—1 dollar.

An option quote with no bid should be capped at a difference no greater than the next higher (put) or lower (call) strike.

In some implementations, error-checking logic may be configured differently for different Vol Ex Indexes. If the current option price is not valid, the Vol Ex Index calculation may be halted at 415. If the current option price is valid, a database record (e.g., stored in the market data table in the VEIP database) may be updated at 416. If there are remaining identified options for which this determination should be performed for 417, this determination may be made for the next identified option 419.

In some implementations, if the option prices are valid, the strike prices may be identified at 421 and, for each identified strike price 423, the prices of both the puts and calls may be determined 425, 429, 431. In one implementation, these prices may be retrieved from a database (e.g., from the market data table in the VEIP database). In another implementation, these prices may be dynamically captured (e.g., via a quote from an exchange).

In some embodiments, the VEIP may utilize one or more pricing models, such a standardized pricing model for options (e.g., Cox-Ross-Rubenstein, Black-Scholes, Roll-Geske-Whaley, Binomial, Trinomial, and/or the like). In one implementation, the choice of the pricing model may depend on quality specifications, timing conditions, hardware capabilities, and/or the like of the VEIP. For example, the Cox-Ross-Rubenstein pricing model may produce more accurate results, while the Black-Scholes pricing model may produce less accurate results but do so faster. In some implementations, the selected pricing model may be selected 433 (e.g., via a configuration setting that specifies the desired pricing model), and the applicable model parameters, assumptions, and/or the like may be applied at 435. For example, a model may utilize interest rate and dividend assumptions and/or determinations (e.g., an example embodiment may utilize LIBOR as the interest rate input for the appropriate time period, i.e., a 3 month option may use 3 month LIBOR, and dividends may be based on the rolling 4 quarter dividend history forecast into the future).

As illustrated in FIGS. 4B and 4C, for each option series 437, 438 the implied volatility and the delta for each option series may be calculated. In one implementation, the implied volatility may be calculated 439 for each option series 443, 445 and a database record (e.g., stored in the model data table in the VEIP database) may be updated 441, and the delta may be calculated 449 for each option series 453, 455 and a database record (e.g., stored in the model data table in the VEIP database) may be updated 451. In another implementation, the implied volatility 440 and the delta 450 may be calculated for each option series 454, 456 and a database record (e.g., stored in the model data table in the VEIP database) may be updated 452. In one implementation, the implied volatility that is captured for each option series may be based off of the mid-point of the bid/ask quote for the option. For example, if the 120 strike calls are $2.03 bid, offered at $2.07, then the price of $2.05 may be used in the option pricing model to calculate the implied volatility for the 120 strike call.

In one embodiment, for each option strike 457, 458, the delta weighted implied volatility may then be calculated 459, 463, 465, and 460, 464, 466 and a database record (e.g., stored in the model data table in the VEIP database) may be updated 461, 462. For example, the implied volatilities may be weighted to reduce the weight of nominally cheap options. In alternative embodiments, different implied volatility weighting schemes (e.g., equal weight) may be used.

In one implementation, the delta of the put and call option of the same strike is summed first, and in any instances where the sum of the put and call delta is less/more than 100%, the delta of both the put and the call is increased/decreased so the sum totals 100% (e.g., by increasing the put and call deltas by half of the distance to 100%, proportionally based on the size of the put and call deltas, and/or the like). For example, if the 120 strike put delta is 55% and the 120 strike call delta is 43%, the 120 options delta total delta is calculated to be 98%. In this instance, both the put delta and call delta would be increased by 1 so that the total delta for the 120 strike options would sum to 100%. Conversely, if the sum of the 120 strike option deltas exceeded 100%, both the put and call delta's may be decreased by the same amount. For example, if the 120 strike put delta was 57% and the 120 strike call delta was 45%, both would be reduced by 1 so the sum of their delta's equaled 100%. Once performed by the VEIP, the resulting delta for the put and the call option of the same strike may be used to weight the implied volatility for both the put and the call option to arrive at an implied volatility for that strike price. For example, the 120 strike put has an implied volatility of 14.3296 and a delta of 56%. At the same time, the 120 strike call has an implied volatility of 15.1157 and a delta of 44%. The 120 strike option volatility may be calculated by the VEIP weighting both the 120 strike put and call implied volatility by their respective deltas. In this case the calculation may be $(14.3296 \times 0.56) + (15.1157 \times 0.44) = 14.675484$, and the implied volatility for the 120 strike options, after weighting the put and call according to their delta, is 14.675484.

In some embodiments of the VEIP, the above described calculation may be performed for the ATM option strikes to arrive at an implied volatility for each option strike. The ATM option strikes themselves may then be weighted 477, 478 according to how far in or out of the money they are, to smooth the Vol Ex Index, and/or the like, based on the weight calculated 469, 473, 475 and, 470, 474, 476 for the ATM option strikes 467, 468 and a database record (e.g., stored in the model data table in the VEIP database) may be updated 471, 472. The weight assigned to each strike is dynamic and moves with changes in the price of the underlying reference security. The Vol Ex Index for the RS may be calculated 477, 478 from option strike delta-weighted implied volatilities and option strike weightings, and output 479, 480 (e.g., published).

In some implementations, the VEIP process may work as described in the following example. For purposes of this example, the initial price of the underlying reference security may be set at $119.74, with the corresponding strike prices used are as follows (included are the calculated implied volatilities for each strike):

$L2=117$ Implied Volatility=20.645907

$L1=118$ Implied Volatility=18.330753

$M=119$ Implied Volatility=16.378518

$U1=120$ Implied Volatility=14.675445

$U2=121$ Implied Volatility=13.278705

$U3=122$ Implied Volatility=11.569698

In some embodiments, the weight of each strike may be dynamically changed with changes in the underlying reference price according to the following logic. First the difference between the M strike and the underlying reference security may be calculated—the resultant value to be denoted by "Diff" in the example below. The weights of each strike are then re-weighted according to the Diff, to ascribe more weight to the strike closest to the money and less to the strikes that are either in the money or out of the money. For example, such weighting may serve as an error checking mechanism. In some implementations, the M strike is initially assigned a weight of 50% minus a factor calculated by multiplying 30% by the Diff, and the other strikes are weighted and then adjusted by the Diff factor as shown below. With the underlying reference security priced at $119.74, Diff is calculated to be 0.74 by taking the difference between the M strike and the underlying reference price.

$$L2 \text{ Weight}=0.05-(0.05\times0.74)=0.013$$

$$L1 \text{ Weight}=0.20-(0.15\times0.74)=0.089$$

$$M \text{ Weight}=0.5-(0.3\times0.74)=0.278$$

$$U1 \text{ Weight}=0.20+(0.3\times0.74)=0.422$$

$$U2 \text{ Weight}=0.05+(0.15\times0.74)=0.161$$

$$U3 \text{ Weight}=(0.05\times0.74)=0.037$$

Thus, in one embodiment, the Vol Ex Index may be calculated as follows:

$$L2 \text{ Implied Vol}\times L2 \text{ Weight } (20.645907\times0.013) \\ =0.268396788$$

$$L1 \text{ Implied Vol}\times L1 \text{ Weight } (18.330753\times0.089) \\ =1.631436987$$

$$M \text{ Implied Vol}\times M \text{ Weight } (16.378518\times0.278) \\ =4.553227987$$

$$U1 \text{ Implied Vol}\times U1 \text{ Weight } (14.675445\times0.422) \\ =6.193037661$$

$$U2 \text{ Implied Vol}\times U2 \text{ Weight } (13.278705\times0.161) \\ =2.137871529$$

$$U3 \text{ Implied Vol}\times U3 \text{ Weight } (11.569698\times0.037) \\ =0.428078815$$

$$\text{Vol Ex Index}=15.21204977$$

In some embodiments, the determined Vol Ex Index may be published to 2 places to the right of the decimal and is rounded accordingly—in this example, 15.21 would be the published Vol Ex Index calculation. In some implementations, this calculation may be the same for all available expiration months—each expiration month results in a separately calculated and published Vol Ex Index. Since options have a finite life and expire, the Vol Ex Indexes may also expire. For example, as of a future or past given date, for example, Apr. 21, 2010, a particular instrument may have or have had options expiring on May 22, 2010, Jun. 19, 2010, Jun. 30, 2010, Aug. 21, 2010, Sep. 30, 2010, Nov. 20, 2010, Dec. 31, 2010, Jan. 22, 2011, Mar. 31, 2011, Dec. 30, 2011, and Jan. 21, 2012. Via the VEIP, each could result in an expiration series and corresponding Vol Ex Index. Following the example, after the expiration of the May 22, 2010 series, the May 22, 2010 Vol Ex Index may no longer be calculated and published. A newly added expiration series, expiring on some future date, may give rise to a new Vol Ex Index to replace the expired Vol Ex Index.

In some embodiments, Vol Ex Indexes may be calculated for each expiration month (and/or other specified period) on one or more selected underlying to correlate to existing expirations available. In such embodiments, as near terms expire, longer dated expirations may be added as is done in the underlying security's options.

As such, it should be understood that advantages, embodiments, examples, functional, features, logical, organizational, structural, topological, and/or other aspects of the disclosure are not to be considered limitations on the disclosure as defined by the claims or limitations on equivalents to the claims. Although the VEIP is discussed in the context of particular embodiments and implementations in financial markets, exchanges, and institutions, it is to be understood that, depending on the particular needs and/or characteristics of a VEIP individual and/or enterprise user, database configuration and/or relational model, data type, data transmission and/or network framework, syntax structure, and/or the like, various embodiments of the VEIP may be implemented that enable a great deal of flexibility and customization. For example, aspects of the VEIP may be adapted for over-the-counter markets and/or securities exchange markets, and/or may be configured to comply with regulatory requirements, market constraints, etc. While various embodiments and discussions of the VEIP have been directed to financial and securities markets and information, and exchange traded financial products and the like, however, it is to be understood that the embodiments described herein may be readily configured and/or customized for a wide variety of other applications and/or implementations.

Vol Ex Product/Option Listing and Vol Ex Index Maintenance

In one embodiment of the VEIP, for each reference security, the available option series that are currently trading may define how many indexes will be calculated. In one implementation, those series may be sorted and grouped by their expiration day. In one implementation, each unique expiration date in turn has a varying number of option series available for trading. In some embodiments, only continuously quoted options may be considered/utilized—for example, in on such implementation, FLEX options, which may not be continuously quoted, may not be considered for use in calculating a Vol Ex Index.

Options on Volatility Expiration Indexes

In some embodiments of the VEIP, each Vol Ex Index may have cash settled, American or European style, index options listed for trading with strike prices surrounding the Vol Ex Index level. Depending on the implementation of the VEIP, various guidelines and/or parameters may be applied or implemented. For example, in one implementation, the following may apply:

Strike prices in $1 intervals.

Strike prices surround the current index level, with new strikes added as needed as the index level increases or decreases.

Option premium multipliers are $100 (e.g., a premium bid of $2=$200).

Expirations may be Short Term (e.g., 6 days), or regular periodic (e.g., monthly) expirations. For example, if you consider the SPY OCTOBER 16 VOLATILITY INDEX discussed above, listing just regular monthly expirations results in having available 3 Vol Ex Index Options expiring on Aug. 18, 2010, Sep. 15, 2010, Oct. 13, 2010 with strike prices for calls and puts as shown in APPENDIX 2D.

Listing a Vol Ex Index Option with an expiration date that was greater than the date when the Volatility Index itself terminates may be prohibited.

Vol Ex Index Options may expire and settle after the close of business 2 business days before the Vol Ex Index terminates. In this example, for a regular expiration this means the Wednesday preceding the $3^{rd}$ Friday of the month.

The closing level of the Vol Ex Index on expiration may be used to settle index options on the Vol Ex Index.

Maintenance of the Volatility Indexes

In some implementations, Vol Ex Indexes have a finite life. In some embodiments, each Vol Ex Index calculation may begin and/or be initiated once a new series of options are listed on the reference security. In these embodiments, once those options expire, the Vol Ex Index may also terminate. In some implementations, Vol Ex Indexes may be relatively short lived (e.g., 1 month), whereas others may exist for longer periods (e.g., 2 years or more). In various embodiments, Vol Ex Indexes may be 2 months, 3 months, 4 months, 5 months, 6 months, 7 month, 8 months, 9 months, 10 months, 11 months, 12 months, 13 months, 14 months, 15 months, 16 months, 17 month, 18 months, 19 months, months, 21 months, 22 months, 23 months, 24 months, 25 months, 26 months, 27 month, 28 months, 29 months, 30 months, 31 months, 32 months, 33 months, 34 months, 35 months, 36 months, 37 months, and/or 38 months and/or various other periods, sub-periods, and/or lengths and/or combinations thereof. For example, in a given period (e.g., September 2010), options on SPY expiring in January 2013 may be listed. The SPY January 2013 Vol Ex Index may be continuously calculated from September 2010 through January 2013 as long as the options markets are open.

VEIP Controller

Figure 5:
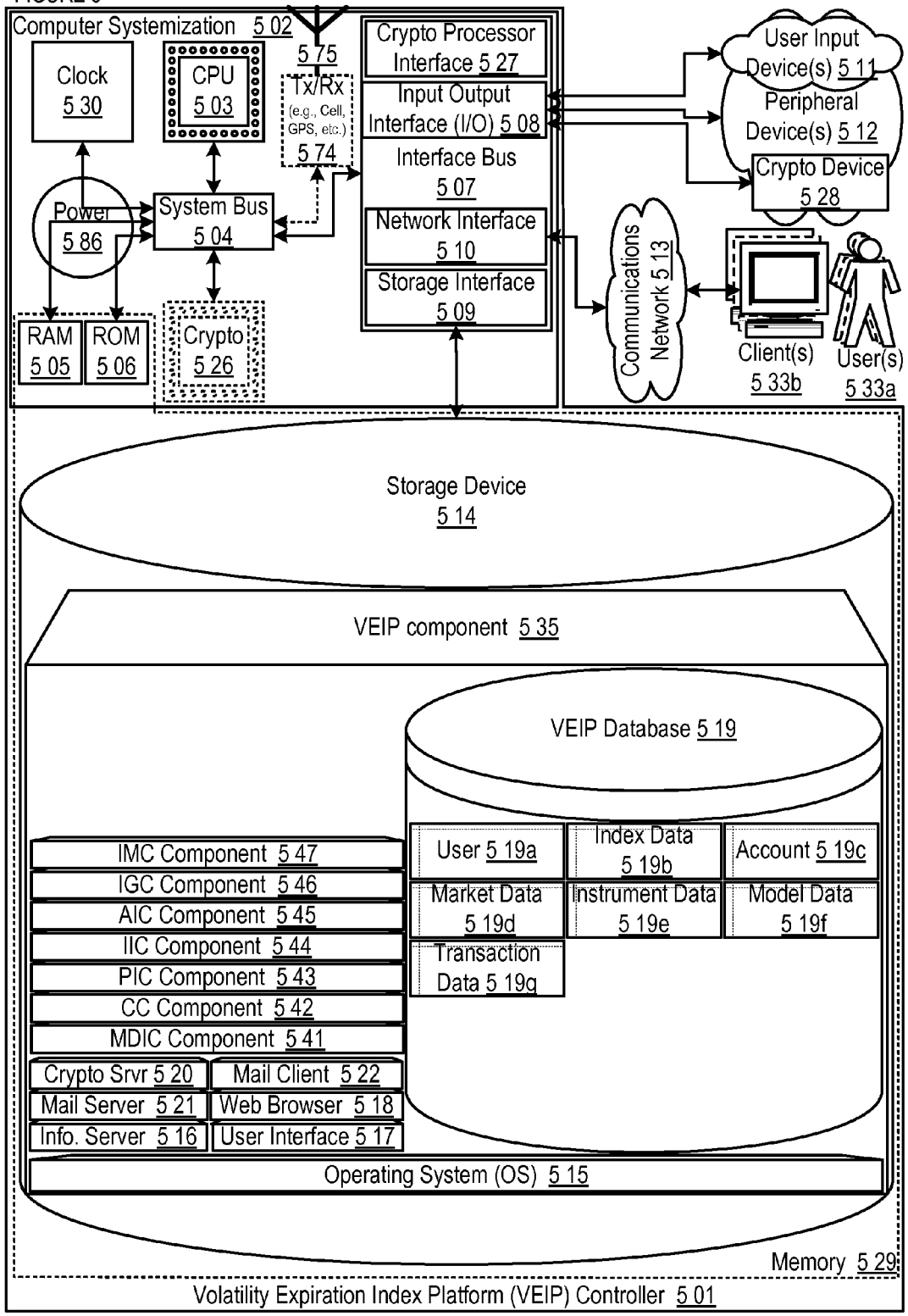
FIG. 5 shows a block diagram illustrating embodiments of a VEIP controller.

FIG. 5 shows a block diagram illustrating embodiments of a VEIP controller. In this embodiment, the VEIP controller 501 may serve to aggregate, process, store, search, serve, identify, instruct, generate, match, and/or facilitate interactions with a computer through information technologies, and/or other related data. Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the VEIP controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The VEIP controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.1 in, Bluetooth 3.0, FM, global positioning system (GPS) (thereby allowing VEIP controller to determine its location)); Broadcom BCM4329FKUBG transceiver chip (e.g., providing 802.1 in, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the VEIP controller and beyond through various interfaces. Should processing requirements dictate a greater amount speed and/or capacity, distributed processors (e.g., Distributed VEIP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the VEIP may be achieved by implementing a microcontroller such as CAST's R8051XC2 microcontroller; Intel's MCS 51 (i.e., 8051 microcontroller); and/or the like. Also, to implement certain features of the VEIP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the VEIP component collection (distributed or otherwise) and/or features may be implemented via the microprocessor and/or via embedded components; e.g., via ASIC, coprocessor, DSP, FPGA, and/or the like. Alternately, some implementations of the VEIP may be implemented with embedded components that are configured and used to achieve a variety of features or signal processing.

Depending on the particular implementation, the embedded components may include software solutions, hardware solutions, and/or some combination of both hardware/software solutions. For example, VEIP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the VEIP features. A hierarchy of programmable interconnects allow logic blocks to be interconnected as needed by the VEIP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the VEIP may be developed on regular FPGAs and then migrated into a fixed version that more resembles ASIC implementations. Alternate or coordinating implementations may migrate VEIP controller features to a final ASIC instead of or in addition to FPGAs. Depending on the implementation all of the aforementioned embedded components and microprocessors may be considered the "CPU" and/or "processor" for the VEIP.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the VEIP thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the VEIP controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed VEIP), architectures may similarly be employed to pool, load balance, and/or otherwise increase the communicative bandwidth required by the VEIP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.). User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the VEIP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the VEIP controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the VEIP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the VEIP controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the VEIP component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the VEIP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the VEIP controller to communicate with other entities through a communications network 513. Various communication protocols may be used by the VEIP controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the VEIP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the VEIP database 519, operating systems, other program components, user interfaces, Web browsers, and/or the like.

Access to the VEIP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VEIP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the VEIP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the VEIP enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the VEIP.

Access to the VEIP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the VEIP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the VEIP component to engage in secure transactions if so desired. The cryptographic component facilitates the secure accessing of resources on the VEIP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The VEIP Database

The VEIP database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the VEIP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the VEIP database is implemented as a data-structure, the use of the VEIP database 519 may be integrated into another component such as the VEIP component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-g. A user table 519a includes fields such as, but not limited to: user_id, user_info, user_rights, user_history, user_transactions, user_portfolio, user_instruments, and/or the like. The user table may support and/or track multiple entity accounts on a VEIP. An index data table 519b includes fields such as, but not limited to: index_id, index_info, index_parameters, index_underlier, index_reference, and/or the like. An account data table 519c includes fields such as, but not limited to: account_id, account_entity, account_status, account_profile, account_parameters, account_history, account_rights, and/or the like. A market data table 519d includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. An instrument data table 519*e* includes fields such as, but not limited to: instrument_id, instrument_source, instrument_parameters, instrument_index, instrument_profile, and/or the like. A model data table 519*f* includes fields such as, but not limited to: model_id, model_parameters, model_assumptions, model rules, model_variables, model_updates, and/or the like. A transaction data table 519*g* includes fields such as, but not limited to: transaction_id, transaction_parties, transaction_parameters, transaction_status, transaction_detail, and/or the like.

In one embodiment, the VEIP database may interact with other database systems. For example, employing a distributed database system, queries and data access by search VEIP component may treat the combination of the VEIP database, an integrated data security layer database as a single database entity.

In one embodiment, user programs may contain various user interface primitives, which may serve to update the VEIP. Also, various accounts may require custom database tables depending upon the environments and the types of clients the VEIP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-g*. The VEIP may be configured to keep track of various settings, inputs, and parameters via database controllers.

The VEIP database may communicate to and/or with other components in a component collection, including itself, and/or facilities of the like. Most frequently, the VEIP database communicates with the VEIP component, other program components, and/or the like. The database may contain, retain, and provide information regarding other nodes and data.

The VEIPs

The VEIP component 535 is a stored program component that is executed by a CPU. In one embodiment, the VEIP component incorporates any and/or all combinations of the aspects of the VEIP that was discussed in the previous figures. As such, the VEIP affects accessing, obtaining and the provision of information, services, transactions, and/or the like across various communications networks.

The VEIP transforms user and market data inputs via VEIP components MDIC 541, CC 542, PIC 543, TIC 544, AIC 545, IGC 546 and IMC 547 into Vol Ex Index publication and Vol Ex Index instrument communications outputs.

The VEIP component enabling access of information between nodes may be developed by employing standard development tools and languages such as, but not limited to: Apache components, Assembly, ActiveX, binary executables, (ANSI) (Objective−) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the VEIP server employs a cryptographic server to encrypt and decrypt communications. The VEIP component may communicate to and/or with other components in a component collection, including itself, and/or facilities of the like. Most frequently, the VEIP component communicates with the VEIP database, operating systems, other program components, and/or the like. The VEIP may contain, communicate, generate, obtain, and/or provide program component, system, user, and/or data communications, requests, and/or responses.

Distributed VEIPs

The structure and/or operation of any of the VEIP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the VEIP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the VEIP controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
```

-continued

```
// read input data from client device in 1024 byte blocks until end
of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR A VOLATILITY EXPIRATION INDEX PLATFORM (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a VEIP individual and/or enterprise user, database configuration and/or relational model, data type, data transmission and/or network framework, syntax structure, and/or the like, various embodiments of the VEIP, may be implemented that enable a great deal of flexibility and customization. For example, aspects of the VEIP may be adapted for over-the-counter markets and/or securities exchange markets, and/or may be configured to comply with regulatory requirements, market constraints, etc. While various embodiments and discussions of the VEIP have been directed to financial and securities markets and information, and exchange traded financial products and the like, however, it is to be understood that the embodiments described herein may be readily configured and/or customized for a wide variety of other applications and/or implementations.

What is claimed is:

1. A computer-implemented method for generating a volatility expiration index instrument, comprising:
    monitoring, by a volatility expiration index platform comprising one or more computers, the volatility expiration index platform independent of, and in electronic communication with, at least one external data source and an electronic exchange server via a network, current market information for a reference security via the at least one external data source,
    the one or more computers comprising non-transitory memory storing computer-readable instructions and one or more processing units executing said computer-readable instructions, said computer-readable instructions defining a specialized instrument generating module that, when executed, causes the one or more computers to perform said monitoring and:
    receiving a reference security identifier corresponding to the reference security;
    determining a current reference security price based on the received reference security identifier and the monitored current market information;
    deriving a plurality of option strike prices from the current reference security price;
    determining implied volatility for options associated with each derived option strike price;
    determining a delta for options associated with each derived option strike price;
    calculating a delta-weighted implied volatility associated with each derived option strike price, the delta-weighted implied volatility being the implied volatility weighted by the delta;
    determining an option strike weighting associated with each derived option strike price;
    calculating a volatility expiration index value for the reference security using a formula that includes as inputs the delta-weighted implied volatilities and option strike weightings associated with the plurality of derived option strike prices; and
    generating at least one volatility expiration index financial instrument having a value that is determined from the calculated volatility expiration index value,
    whereupon completion of the generating step, the at least one generated volatility expiration index financial instrument is introduced into a financial instrument exchange market via the electronic exchange server where it is automatically listed for trading,
    the at least one volatility expiration index financial instrument having a maturity corresponding to the volatility expiration index value.

2. The method of claim 1, wherein the reference security is an exchange traded fund.

3. The method of claim 1, wherein the reference security is a stock.

4. The method of claim 1, wherein the generated volatility expiration index financial instrument is cash settled.

5. The method of claim 1, wherein the generated volatility expiration index financial instrument is an American style option.

6. The method of claim 1, wherein the generated volatility expiration index financial instrument is a European style option.

7. The method of claim 1, wherein the generated volatility expiration index financial instrument has PM settlement.

8. The method of claim 1, wherein determining implied volatility for options associated with each derived option strike price further comprises determining implied volatilities for a put and for a call associated with each derived option strike price.

9. The method of claim 1, wherein determining delta for options associated with each derived option strike price further comprises determining delta for a put and for a call associated with each derived option strike price.

10. The method of claim 1, wherein the determining a current reference security price further comprises verifying that error-checking logic for the reference security is satisfied.

11. The method of claim 10, wherein the error-checking logic for the reference security is satisfied when (1) there is a last sale in the reference security, and (2) for the last sale of the reference security, a specified number of quote values in a specified number of periods do not exceed reference security collar logic.

12. The method of claim 1, wherein the deriving a plurality of option strike prices further comprises verifying that error-checking logic for options associated with each derived option strike price is satisfied.

13. The method of claim 12, wherein the error-checking logic for an option is satisfied when (1) there is a quote for the option, and (2) for the option, a specified number of quote midpoint values in a specified number of periods do not exceed option collar logic.

14. A tangible, non-transitory computer-readable medium storing processor-issuable instructions that, when executed by at least one processor, generate a specialized instrument generating module that is specifically configured to generate volatility expiration index instruments by performing the following functions:
- monitor, by a volatility expiration index platform comprising one or more computers, the volatility expiration index platform independent of, and in electronic communication with, at least one external data source and an electronic exchange server via a network, current market information for a reference security;
- receive a reference security identifier corresponding to the reference security;
- determine a current reference security price based on the received reference security identifier and the monitored current market information;
- derive a plurality of option strike prices from the current reference security price;
- determine implied volatility for options associated with each derived option strike price;
- determine a delta for options associated with each derived option strike price;
- calculate a delta-weighted implied volatility associated with each derived option strike price, the delta-weighted implied volatility being the implied volatility weighted by the delta;
- determine an option strike weighting associated with each derived option strike price;
- calculate a volatility expiration index value for the reference security using a formula that includes as inputs the delta-weighted implied volatilities and option strike weightings associated with the plurality of derived option strike prices; and
- generate at least one volatility expiration index financial instrument having a value that is determined from the calculated volatility expiration index value,
- whereupon completion of the generate function, the at least one generated volatility expiration index financial instrument is introduced into a financial instrument exchange market via an electronic exchange server where it is automatically listed for trading,
- the at least one volatility expiration index financial instrument having a maturity corresponding to the volatility expiration index value.

15. A volatility expiration index instrument generating apparatus, comprising:
- a memory;
- a processor disposed in communication with said memory, and configured to issue a plurality of processing instructions stored in the memory, said apparatus in electronic communication with at least one external data source and an electronic exchange server via a network, execution of the instructions generating a specialized instrument generating module that causes the apparatus to:
  - monitor by a volatility expiration index platform comprising one or more computers, the volatility expiration index platform independent of, and in electronic communication with, at least one external data source and an electronic exchange server via a network, current market information for a reference security;
  - receive a reference security identifier corresponding to the reference security;
  - determine a current reference security price based on the received reference security identifier and the monitored current market information;
  - derive a plurality of option strike prices from the current reference security price;
  - determine implied volatility for options associated with each derived option strike price;
  - determine a delta for options associated with each derived option strike price;
  - calculate a delta-weighted implied volatility associated with each derived option strike price, the delta-weighted implied volatility being the implied volatility weighted by the delta;
  - determine an option strike weighting associated with each derived option strike price;
  - calculate a volatility expiration index value for the reference security using a formula that includes as inputs the delta-weighted implied volatilities and option strike weightings associated with the plurality of derived option strike prices;
  - generate at least one volatility expiration index financial instrument having a value that is determined from the calculated volatility expiration index value; and
  - introduce the at least one generated volatility expiration index financial instrument into a financial instrument exchange market via the electronic exchange server where it is automatically listed for trading,
- the at least one volatility expiration index financial instrument having a maturity corresponding to the volatility expiration index value.

* * * * *